(12) United States Patent
Takahashi et al.

(10) Patent No.: US 11,799,412 B2
(45) Date of Patent: Oct. 24, 2023

(54) MOTOR

(71) Applicant: DENSO CORPORATION, Kariya (JP)

(72) Inventors: Kouhei Takahashi, Kariya (JP);
Yoshinobu Nagao, Kariya (JP)

(73) Assignee: DENSO CORPORATION, Kariya (JP)

( * ) Notice: Subject to any disclaimer, the term of this patent is extended or adjusted under 35 U.S.C. 154(b) by 466 days.

(21) Appl. No.: 17/265,380

(22) PCT Filed: Jul. 22, 2019

(86) PCT No.: PCT/JP2019/028612
§ 371 (c)(1),
(2) Date: Feb. 2, 2021

(87) PCT Pub. No.: WO2020/026869
PCT Pub. Date: Feb. 6, 2020

(65) Prior Publication Data
US 2021/0313919 A1 Oct. 7, 2021

(30) Foreign Application Priority Data
Aug. 3, 2018 (JP) .................................. 2018-146596

(51) Int. Cl.
| H02P 27/06 | (2006.01) |
| H02P 29/024 | (2016.01) |
| H02P 29/50 | (2016.01) |
| F04D 13/06 | (2006.01) |
| F04D 29/40 | (2006.01) |

(52) U.S. Cl.
CPC ............ *H02P 29/027* (2013.01); *F04D 13/06* (2013.01); *F04D 29/406* (2013.01); *H02P 29/50* (2016.02); *H02P 2209/01* (2013.01)

(58) Field of Classification Search
CPC ..... H02P 29/027; H02P 29/50; H02P 2209/01
See application file for complete search history.

(56) References Cited

U.S. PATENT DOCUMENTS

| 11,689,048 B1* | 6/2023 | LaBach ................. H02J 7/0013 307/66 |
| 2006/0022623 A1 | 2/2006 | Inaba et al. |
| 2015/0061423 A1* | 3/2015 | Nagao .................... H02K 11/33 310/68 D |

FOREIGN PATENT DOCUMENTS

| JP | 2004-350384 A | 12/2004 |
| JP | 2006-050714 A | 2/2006 |
| JP | 2006-287990 A | 10/2006 |
| JP | 4260110 B2 | 4/2009 |
| JP | 2009-268332 A | 11/2009 |

(Continued)

*Primary Examiner* — Muhammad S Islam
(74) *Attorney, Agent, or Firm* — Oliff PLC (57) ABSTRACT

A motor including: a stator including plural windings that form coils and are connected together at a neutral point; a switching circuit that generates a rotating magnetic field around the stator by switching of a power supply to the plurality of windings; a rotor that rotates in response to the rotating magnetic field generated around the stator; a resistor for current detection that detects a current in the switching circuit and that is disposed between the switching circuit and a grounding point; and a filter element that reduces a fluctuation in potential at the neutral point, the filter element being disposed between the neutral point and the resistor for current detection and being grounded at the grounding point via the resistor for current detection.

13 Claims, 7 Drawing Sheets

(56) References Cited

FOREIGN PATENT DOCUMENTS

| | | |
|---|---|---|
| JP | 2010-193699 A | 9/2010 |
| JP | 2012-060827 A | 3/2012 |
| JP | 2017-082755 A | 5/2017 |

* cited by examiner

MOTOR

TECHNICAL FIELD

The present disclosure relates to a motor.

BACKGROUND ART

Japanese Patent Application Laid-Open (JP-A) No. 2004-350384 discloses a brushless DC motor. The brushless DC motor disclosed therein includes a stator with three windings in three phases connected together by a star connection, and a rotor that rotates in response to a rotating magnetic field generated around the stator. A neutral point of the respective phase windings is connected to ground via a capacitor, thereby suppressing fluctuations in potential at the neutral point. Electromagnetic wave noise is thereby reduced.

SUMMARY OF INVENTION

Technical Problem

However, in configurations that include a filter element such as a capacitor in order to suppress fluctuations in potential at the neutral point, suppressing overcurrent damage to the filter element is of the utmost importance.

The present disclosure provides a motor that may suppress overcurrent damage to a filter element.

Solution to Problem

A first aspect of the present disclosure is a motor including: a stator including plural windings that form coils and are connected together at a neutral point; a switching circuit that generates a rotating magnetic field around the stator by switching of a power supply to the plural windings; a rotor that rotates in response to the rotating magnetic field generated around the stator; a resistor for current detection that detects a current in the switching circuit and that is disposed between the switching circuit and a grounding point; and a filter element that reduces a fluctuation in potential at the neutral point, the filter element being disposed between the neutral point and the resistor for current detection and being grounded at the grounding point via the resistor for current detection.

In the first aspect of the present disclosure, using the switching circuit to switch the power to the plural windings generates a rotating magnetic field around the stator. The rotor rotates in response to the rotating magnetic field. Note that the current detection resistor of the motor of the first aspect of the present disclosure is provided between the switching circuit and the grounding point. This enables the current in the switching circuit to be detected. The filter element is provided between the neutral point and the current detection resistor. The filter element is grounded at the grounding point via the current detection resistor. Providing the filter element enables fluctuation in potential at the neutral point to be reduced. Moreover, grounding the filter element at the grounding point via the current detection resistor reduces the voltage applied to the filter element. Thus, the first aspect of the present disclosure may suppress overcurrent damage to the filter element.

A second aspect of the present disclosure, in the first aspect, may further include a current detection circuit that detects a current in the filter element based on a potential difference between two ends of the resistor, and a control circuit that stops operation of the switching circuit in a case in which the current detected by the current detection circuit has exceeded a predetermined threshold.

According to the motor of the second aspect of the present disclosure, in cases in which the current detected by the current detection circuit exceeds the predetermined threshold, there is determined to be a possibility that the filter element has been damaged, and operation of the switching circuit is stopped. Thus, the second aspect of the present disclosure may suppress damage to motor circuitry from becoming more serious.

A third aspect of the present disclosure, in the first aspect or the second aspect, may further include a reverse connection protection element mounted between the neutral point and the grounding point.

The motor of the third aspect of the present disclosure is mounted with the reverse connection protection element configured by a type of diode. Thus, the third aspect of the present disclosure may prevent damage to elements configuring motor circuitry in cases in which, for example, a power source is connected with its polarity reversed.

In a fourth aspect of the present disclosure, in the third aspect, the reverse connection protection element may be mounted between the resistor and the grounding point.

According to the motor of the fourth aspect of the present disclosure, the reverse connection protection element is mounted close to the grounding point. Thus, the fourth aspect of the present disclosure may eliminate the effects of voltage fluctuations caused by other elements, thus may obtain a stable installation reference voltage.

Advantageous Effects of Invention

According to the above aspects, the motor of the present disclosure may suppress overcurrent damage to a filter element.

DESCRIPTION OF EMBODIMENTS

Figure 1:
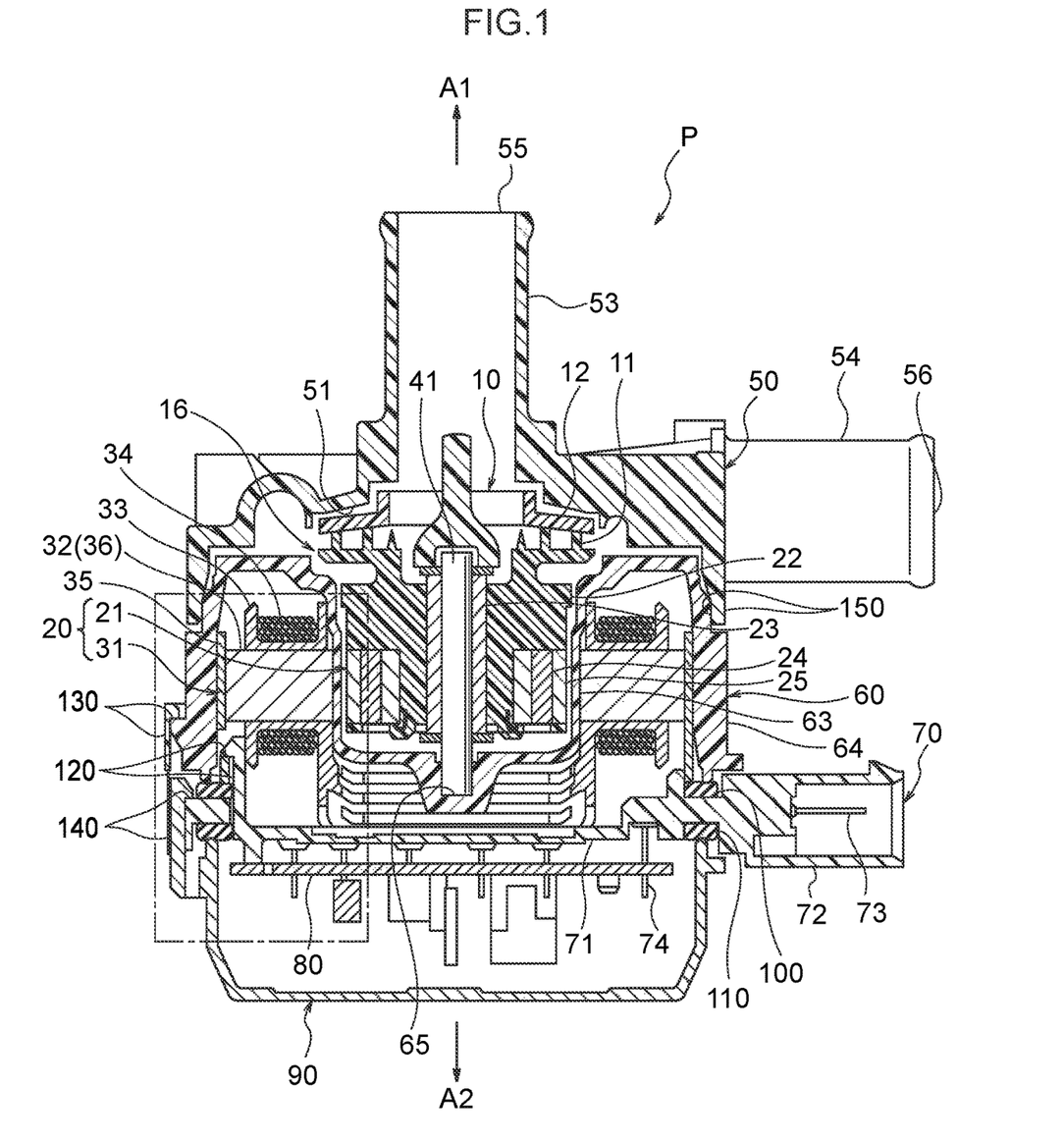
FIG. 1 is a cross-sectional view illustrating a water pump provided with a motor of an exemplary embodiment.

As illustrated in FIG. 1, an electric pump P equipped with a motor unit 20 serving as a motor according to an exemplary embodiment of the present disclosure includes an impeller 10, the motor unit 20, pump housing 50, motor housing 60, a support member 70, a circuit board 80, board housing 90, a first gasket 100, and a second gasket 110. Note that the arrow A1 indicates one axial direction side of the electric pump P, and the arrow A2 indicates the other axial direction side of the electric pump P.

The impeller 10 is disposed on the one axial direction side of a rotor 21, described later. The impeller 10 is made of resin as an example, and includes plural vanes 11 and a cover 12. The plural vanes 11 radiate in a spiral pattern from a central portion of the impeller 10. The cover 12 is formed in a disc shape, and covers the plural vanes 11 on the one axial direction side of the impeller 10. The impeller 10 is integrally formed of resin together with a body 22 of the rotor 21, described below, such that the entire impeller 10 rotates integrally with the rotor 21. The impeller 10 and the rotor 21, described below, thus configure an impeller member 16.

The motor unit 20 includes the rotor 21, a stator 31, and a motor shaft 41. The rotor 21 includes the body 22, a shaft bearing 23, a rotor magnet 24, and a rotor core 25. The body 22 is made of resin and formed in a circular tube shape. The shaft bearing 23 is provided to an inner circumferential portion of the body 22, and the rotor core 25 is provided to an outer circumferential portion of the body 22. The rotor core 25 has a double-walled circular tubular structure including an inner circumferential portion and an outer circumferential portion. The rotor magnet 24 is provided between the inner circumferential portion and the outer circumferential portion of the rotor core 25.

Overall, the rotor 21 is formed in a substantially circular tube shape (a substantially circular columnar profile with a hole penetrating the axial center thereof). The motor shaft 41 is inserted into the shaft bearing 23, such that the rotor 21 is rotatably supported by the motor shaft 41. The rotor 21 (rotor magnet 24) is disposed at the radial direction inside of the stator 31, described below, so as to oppose the stator 31.

The stator 31 includes a stator core 32, an insulator 33, windings 34, and a stator yoke 35. The stator core 32 includes plural teeth 36 extending in a radiating pattern. The insulator 33 is installed to the stator 31, and the windings 34 are wound around the respective teeth 36 with the insulator 33 interposed therebetween. The stator yoke 35 is formed in a tube shape, and the stator core 32 is press-fitted inside the stator yoke 35. Overall, the stator 31 is formed with a substantially annular profile.

The pump housing 50 is disposed on the one axial direction side of the motor housing 60, described later. The pump housing 50 is formed in a recessed shape opening toward the motor housing 60. A pump chamber 51 that houses the impeller 10 is formed inside the pump housing 50. The pump housing 50 is fixed to the motor housing 60 by a welded fixing portion 150.

The pump housing 50 includes an inlet 53 and an outlet 54. The inlet 53 extends from a central portion of the pump housing 50 toward the opposite side to the motor housing 60. The outlet 54 extends from an outer portion of the pump housing 50 in a direction tangential to the pump housing 50. The inlet 53 is formed with an intake port 55 that is in communication with the pump chamber 51. The outlet 54 is formed with a discharge port 56 that is likewise in communication with the pump chamber 51.

The motor housing 60 has a double-walled structure including an inner cylinder 63 and an outer cylinder 64, each of which has a closed-bottomed tube shape. The inner cylinder 63 opens toward the pump housing 50, whereas the outer cylinder 64 opens toward the opposite side to the pump housing 50.

The rotor 21 is rotatably housed inside the inner cylinder 63. The stator 31 is housed between the inner cylinder 63 and the outer cylinder 64 in a state press-fitted between the inner cylinder 63 and the outer cylinder 64. A recess shaped shaft support 65 opening toward the pump housing 50 is formed to a bottom wall of the inner cylinder 63. The motor shaft 41 is press-fitted into this shaft support 65. A bottom wall of the outer cylinder 64 is coupled to an open end portion of the inner cylinder 63.

The support member 70 is disposed on the opposite side of the motor housing 60 to the pump housing 50. The support member 70 includes a disc portion 71 that opposes the motor housing 60 in the axial direction of the motor housing 60, and a connector 72 that projects toward the radial direction outside of the disc portion 71 from part of an outer circumferential portion of the disc portion 71. A connection terminal 73 is provided to the connector 72. The connection terminal 73 is integrally formed with a terminal portion 74.

The stator 31 is assembled to the support member 70 through a first snap-fit structure 120. The motor housing 60 is assembled to the support member 70 through a second snap-fit structure 130. In a state in which the stator 31 and the motor housing 60 have been assembled to the support member 70 through the first snap-fit structure 120 and the second snap-fit structure 130 in this manner, the first gasket 100, configured by a waterproof, vibration damping elastic material, is interposed between the support member 70 and the stator 31 and motor housing 60.

The circuit board 80 is disposed on the opposite side of the disc portion 71 of the support member 70 to the motor housing 60. The circuit board 80 opposes the disc portion 71 and is fixed to the disc portion 71. Terminal portions of the windings 34 extending from the stator 31 are connected to the circuit board 80.

Figure 2:
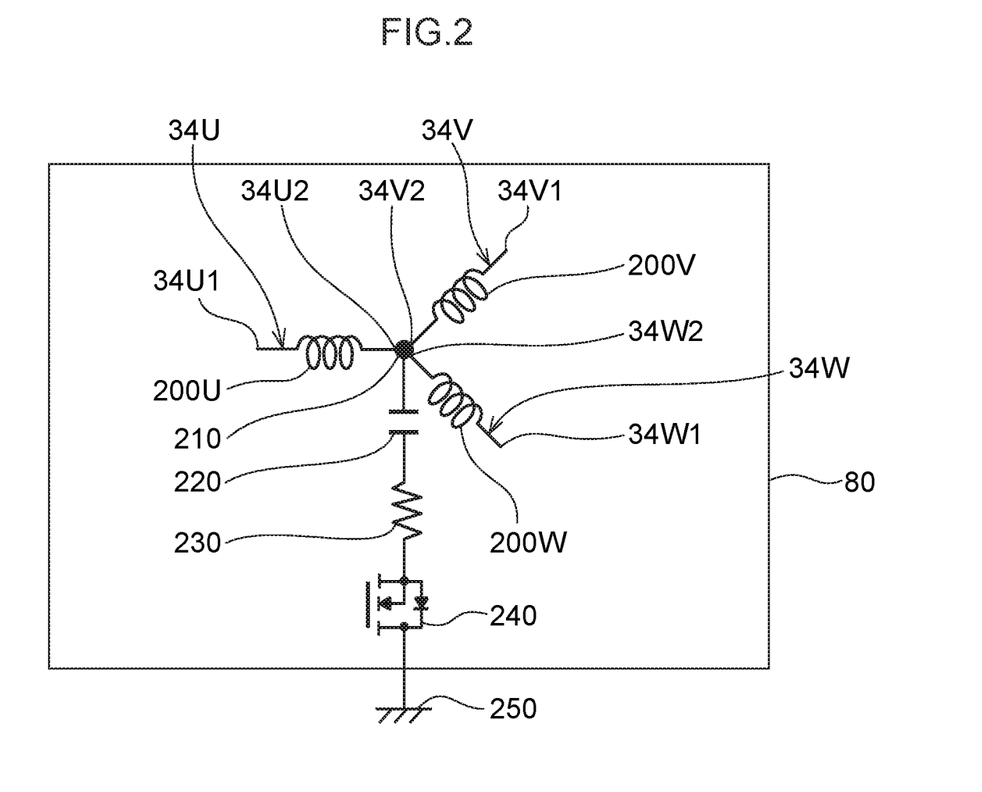
FIG. 2 is a circuit diagram illustrating circuitry between a neutral point and a grounding point.

Note that as illustrated in FIG. 2, in the present exemplary embodiment, a U-phase winding 34U, a V-phase winding 34V, and a W-phase winding 34W are employed. The U-phase winding 34U, the V-phase winding 34V, and the W-phase winding 34W are respectively wound around the plural teeth 36 of the stator core 32 (see FIG. 1) to form a U-phase coil 200U, a V-phase coil 200V, and a W-phase coil 200W.

An end portion 34U1 on one side of the U-phase winding 34U, an end portion 34V1 on one side of the V-phase winding 34V, and an end portion 34W1 on one side of the W-phase winding 34W are each connected to the circuit board 80.

Figure 3:
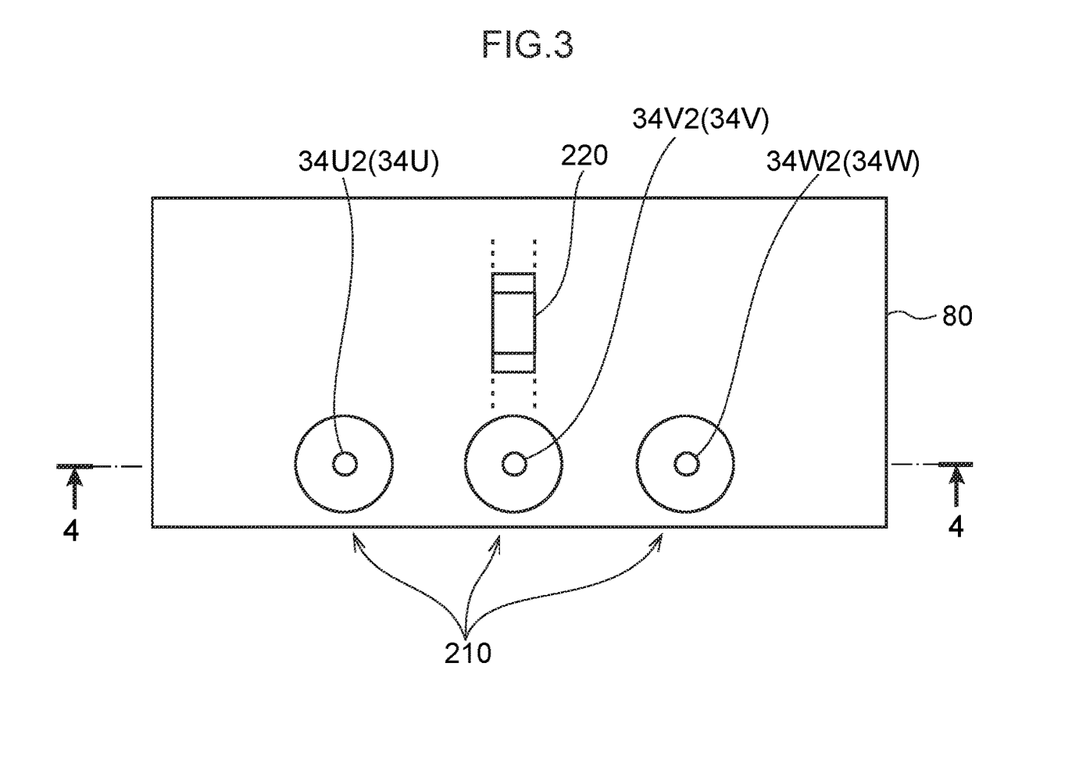
FIG. 3 is a plan view schematically illustrating connection between a circuit board and windings.
Figure 4:
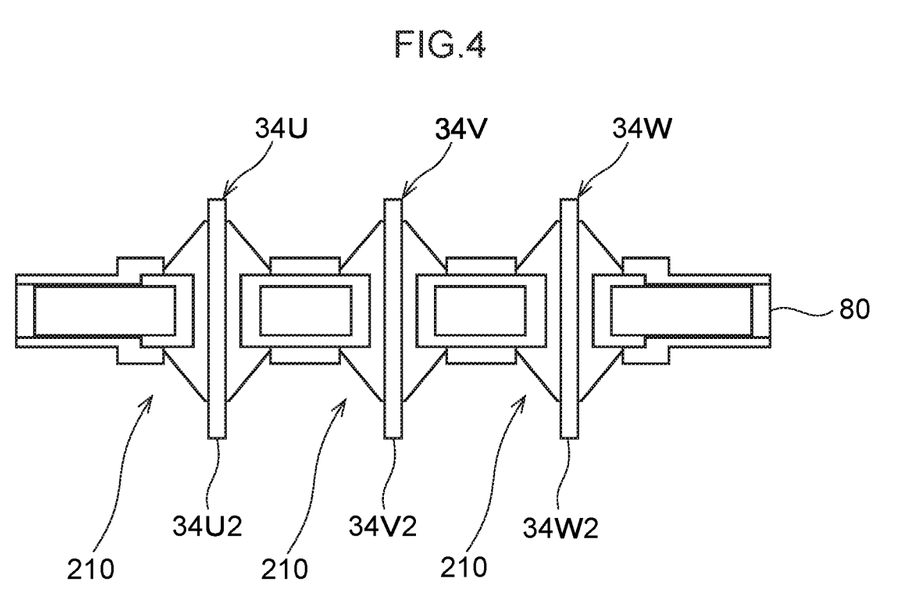
FIG. 4 is a cross-section illustrating a circuit board as sectioned along line 5-5 in FIG. 4.

As illustrated in FIG. 2, FIG. 3, and FIG. 4, an end portion 34U2 on the other side of the U-phase winding 34U, an end portion 34V2 on the other side of the V-phase winding 34V, and an end portion 34W2 on the other side of the W-phase winding 34W are also connected to the circuit board 80. Thus, the other side end portion 34U2 of the U-phase winding 34U, the other side end portion 34V2 of the V-phase winding 34V, and the other side end portion 34W2 of the W-phase winding 34W are connected to one another on the circuit board 80. Namely, a location where the other side end portion 34U2 of the U-phase winding 34U, the other side end portion 34V2 of the V-phase winding 34V, and the other side end portion 34W2 of the W-phase winding 34W are connected to one another on the circuit board 80 configures a neutral point 210. The U-phase winding 34U, the V-phase winding 34V, and the W-phase winding 34W are thus wired together in a star connection.

Figure 5:
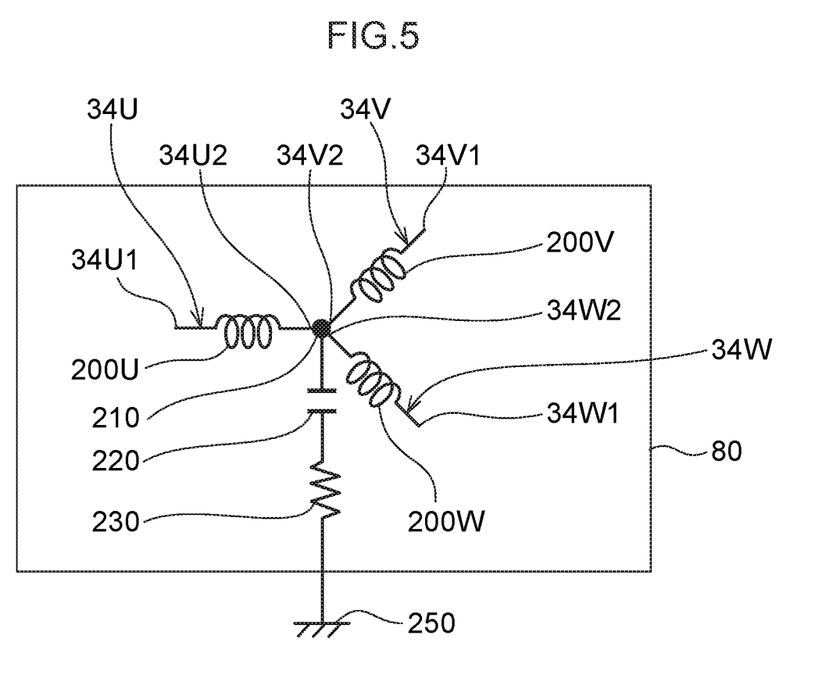
FIG. 5 is a circuit diagram corresponding to FIG. 2, illustrating circuitry between a neutral point and a grounding point in a case in which a reverse connection protection FET is not employed.

As illustrated in FIG. 2 and FIG. 3, the neutral point 210 is grounded at a grounding point 250 via a capacitor 220 serving as a filter element described in detail later, a shunt resistor 230 serving as a current detection resistor, and a reverse connection protection FET 240. The reverse connection protection FET 240 is a FET (field-effect transistor) with its drain and gate shorted together so as to function as a type of diode. Note that as illustrated in FIG. 5, configuration in which the reverse connection protection FET 240 is omitted is also possible.

As illustrated in FIG. 1, a motor driver for supplying power to the windings 34 of the stator 31, a control element for controlling the motor driver, and the like are mounted on the circuit board 80. The terminal portion 74 that extends from the connection terminal 73 is connected to the circuit board 80.

The board housing 90 is disposed on the opposite side of the support member 70 to the motor housing 60. The board housing 90 is formed in a recessed shape that opens toward the support member 70. The board housing 90 is assembled to the support member 70 through a third snap-fit structure 140. In a state in which the board housing 90 has been assembled to the support member 70 through the third snap-fit structure 140 in this manner, the second gasket 110, configured by a waterproof, vibration damping elastic material similar to the first gasket 100, is interposed between the support member 70 and the board housing 90.

Figure 6:
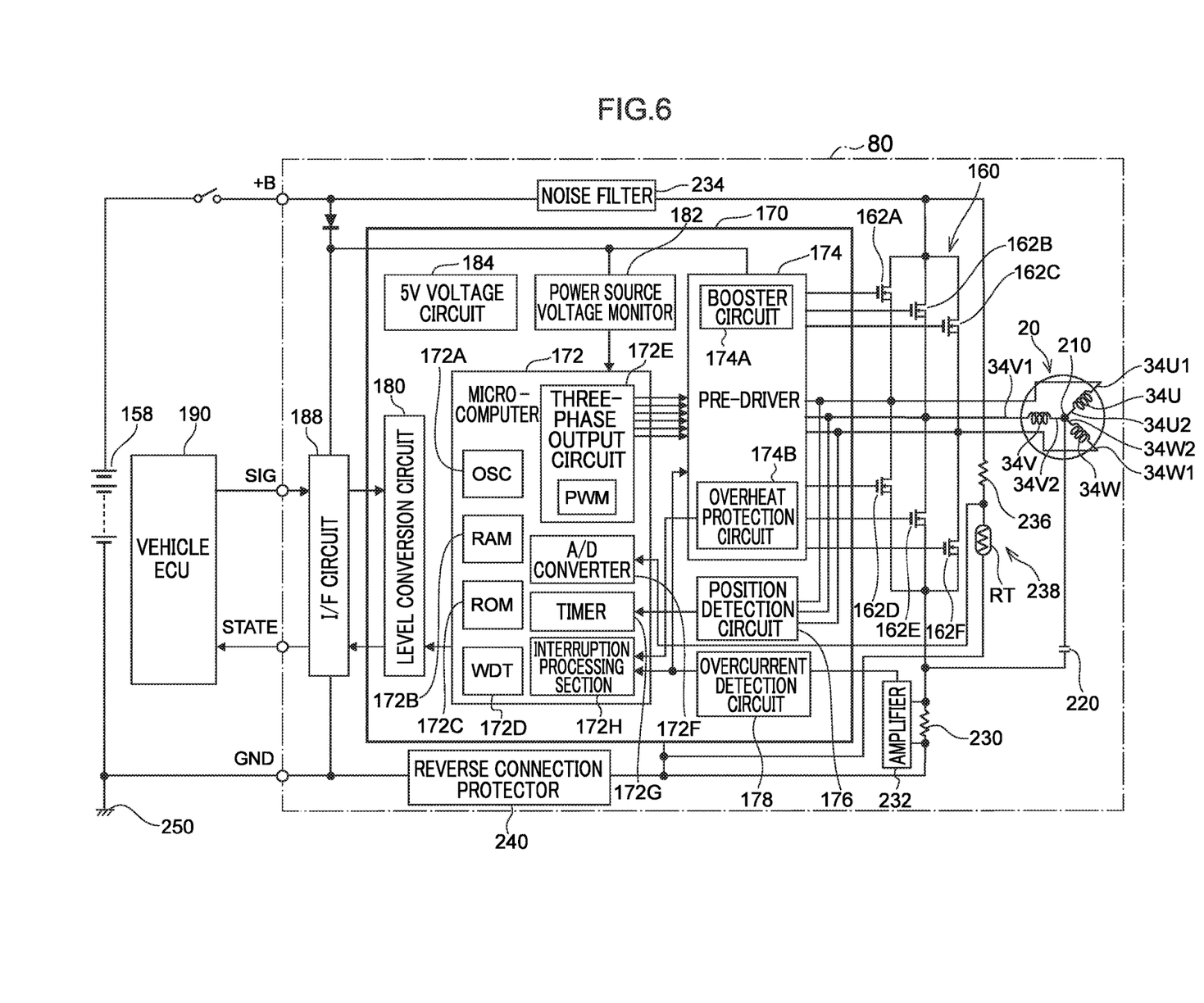
FIG. 6 is a block diagram illustrating an example of a configuration of a circuit board.

FIG. 6 is a block diagram illustrating an example of a configuration of the circuit board 80. As illustrated in FIG. 6, the circuit board 80 according to the present exemplary embodiment includes an invertor circuit 160 configuring the motor driver that generates a voltage to be supplied to the windings 34U, 34V, 34W of the motor unit 20 and supplies this voltage to the windings 34U, 34V, 34W, a control circuit 170 that controls the invertor circuit 160, and an I/F circuit 188 configuring a communication interface between the control circuit 170 and vehicle electronic control unit (ECU) 190 configuring a higher level control device than the control circuit 170.

A voltage divider circuit 238 configured by a resistor 236 and a thermistor RT is also mounted on the circuit board 80. A resistance value of the thermistor RT of the voltage divider circuit 238 changes according to the temperature of the circuit board 80, such that the voltage of a signal output by the voltage divider circuit 238 also changes according to the temperature of the circuit board 80. As described later, the signal output from the voltage divider circuit 238 is input to an A/D convertor 172F of a microcomputer 172 of the control circuit 170.

As an example, the I/F circuit 188 is a circuit that converts a communication protocol used by the vehicle ECU 190 to a protocol corresponding to a communication function of the control circuit 170, and that also converts the protocol corresponding to the communication function of the control circuit 170 to the communication protocol used by the vehicle ECU 190. As an example, a local interconnect network (LIN) is employed as the communication protocol of the vehicle ECU 190. A signal from the vehicle ECU 190 whose communication protocol has been converted by the I/F circuit 188 is adjusted to an upper limit voltage value by a level conversion circuit 180 of the control circuit 170 and then input to the microcomputer 172 of the control circuit 170.

The invertor circuit 160 is a type of H-bridge circuit configured by six N-type FETs 162A, 162B, 162C, 162D, 162E, 162F, serving as switching elements.

In the present exemplary embodiment, the voltage supplied to the windings 34U, 34V, 34W is generated by pulse width modulation (PWM) in which ON/OFF switching of the switching elements of the invertor circuit 160 is used to modulate a voltage (substantially 12V) from a battery 158 configuring a power source so as to form a pulse shaped waveform. The effective value of the voltage modulated into a pulse shaped waveform varies according to what is referred to as the duty ratio.

In the present exemplary embodiment, the duty ratio corresponds to the duration of a single pulse generated when the aforementioned switching elements are switched ON as a proportion of one full period of the voltage waveform generated by PWM. One full period of the voltage waveform generated by PWM corresponds to the sum of the aforementioned duration of a single pulse and a duration in which the aforementioned switching elements are switched OFF and no pulse is generated. Based on the duty ratio computed by the control circuit 170, the invertor circuit 160 performs ON/OFF switching of the FETs 162A to 162F configuring the switching elements in the invertor circuit 160 so as to generate the voltage to be supplied to the windings 34U, 34V, 34W.

The respective drains of the FETs 162A, 162B, 162C are connected to a positive electrode of the battery 158 via a noise filter 234. As an example, the noise filter 234 is a choke coil used to eliminate noise. The respective sources of the FETs 162D, 162E, 162F are connected to a negative electrode of the battery 158 and also grounded at the grounding point 250 via the shunt resistor 230 and the reverse connection protection FET 240.

The source of the FET 162A and the drain of the FET 162D are connected to the one side end portion 34U1 of the U-phase winding 34U, the source of the FET 162B and the drain of the FET 162E are connected to the one side end portion 34V1 of the V-phase winding 34V, and the source of the FET 162C and the drain of the FET 162F are connected to the one side end portion 34W1 of the W-phase winding 34W.

The respective gates of the FETs 162A to 162F are connected to a pre-driver 174 of the control circuit 170. As described later, when a pulse shaped drive signal is input to the respective gates of the FETs 162A to 162F from the pre-driver 174, the FETs 162A to 162F are set to an ON state and generate the voltage to be supplied to the windings 34U, 34V, 34W.

One side of the capacitor 220 configuring the filter element is connected to the neutral point 210 to which the other side end portion 34U2 of the U-phase winding 34U, the other side end portion 34V2 of the V-phase winding 34V, and the other side end portion 34W2 of the W-phase winding 34W are respectively connected. The other side of the capacitor 220 is connected between the shunt resistor 230 and the respective sources of the FETs 162D, 162E, 162F.

An element that absorbs electromagnetic wave noise, such as inductors or ferrite beads, may be employed as a filter element instead of the capacitor 220. Such inductors or ferrite beads would for example be respectively provided between the other side end portion 34U2 of the U-phase winding 34U and the neutral point 210, between the other side end portion 34V2 of the V-phase winding 34V and the neutral point 210, and between the other side end portion 34W2 of the W-phase winding 34W and the neutral point 210. Thus, the neutral point 210 would not need to be grounded to the grounding point 250, in contrast to cases in which the capacitor 220 is employed.

An amplifier 232 is connected to the two ends of the shunt resistor 230 to amplify the potential difference between the two ends of the shunt resistor 230 and output a voltage value proportionate to the current in the shunt resistor 230 as a signal. The signal output by the amplifier 232 is input to an overcurrent detection circuit 178 of the control circuit 170. Based on the signal output by the amplifier 232, the overcurrent detection circuit 178 determines whether or not the current in the invertor circuit 160, the windings 34U, 34V, 34W, or the capacitor 220 (hereafter referred to as the motor current) has exceeded a predetermined threshold for determining an overcurrent state.

The control circuit 170 is a type of integrated circuit, and includes the microcomputer 172. Based on a command from the vehicle ECU 190 and the position of the rotor 21 as detected by a position detection circuit 176 based on induced voltage in the windings 34U, 34V, 34W when unpowered, the microcomputer 172 determines the voltage phase to be supplied to the windings 34U, 34V, 34W, and outputs a PWM signal for generating a voltage in accordance with the determined phase.

Since the voltage required to place the FETs 162A to 162F of the invertor circuit 160 in the ON state is a low voltage, the voltage of the PWM signal output by the microcomputer 172 is amplified by the pre-driver 174, that includes a booster circuit 174A, to generate the aforementioned drive signal, and the thus generated drive signal is output to the respective gates of the FETs 162A to 162F configuring the invertor circuit 160.

In cases in which operation of the pre-driver 174 has caused the pre-driver 174 to overheat, a signal indicating this overheated state is output to an interruption processing section 172H of the microcomputer 172.

The microcomputer 172 is a type of computation circuit including an oscillator (OSC) 172A configuring a transmitter that generates a clock relating to operation timing, RAM 172B configuring a storage device, ROM 172C, and a watchdog timer (WDT) 172D that periodically checks that the microcomputer 172 is functioning. The microcomputer 172 further includes a timer 172G that is input with information from the position detection circuit 176 relating to the position of the rotor 21, and a three-phase output circuit 172E that determines the phase of the voltage to be supplied to the windings 34U, 34V, 34W based on the information input to the timer 172G and a command signal from the vehicle ECU 190, and that generates a PWM signal for generating the voltage in accordance with the determined phase. The microcomputer 172 further includes the A/D converter 172F that converts an analogue signal input by the voltage divider circuit 238 to a digital signal, and the interruption processing section 172H input with the respective signals output from the overcurrent detection circuit 178 and an overheat protection circuit 174B of the pre-driver 174. The command signal from the vehicle ECU 190 is for example a command value for the rotation speed of the rotor 21 according to the temperature of cooling water in a vehicle engine as detected by a water temperature sensor (not illustrated in the drawings).

In cases in which the temperature of the circuit board 80 as indicated by a digital signal output by the A/D converter 172F has reached an overheated state, the microcomputer 172 outputs from the three-phase output circuit 172E a PWM signal to lower the duty ratio for voltage supply to the windings 34U, 34V, 34W, thereby lowering the rotation speed of the rotor 21 in comparison to the rotation speed command value indicated by the command signal output from the vehicle ECU 190.

Moreover, in cases in which a signal indicating that the pre-driver 174 is in an overheated state is input to the interruption processing section 172H from the overheat protection circuit 174B of the pre-driver 174, the microcomputer 172 outputs from the three-phase output circuit 172E a PWM signal to lower the duty ratio for voltage supply to the windings 34U, 34V, 34W.

Furthermore, in cases in which a signal indicating that the overcurrent detection circuit 178 has detected an overheated state is input to the interruption processing section 172H, the microcomputer 172 stops the switching operation of the FETs 162A to 162F of the invertor circuit 160 and halts generation of the voltage to be supplied to the windings 34U, 34V, 34W. The microcomputer 172 also outputs a signal indicating that an anomaly has occurred in the FETs 162A to 162F, capacitor 220, or the like mounted on the circuit board 80 to the vehicle ECU 190 via the level conversion circuit 180 and the I/F circuit 188.

The control circuit 170 also includes a 5V power source circuit 184 for operating the microcomputer 172, and a power source voltage monitor 182 that monitors the voltage of the battery 158.

The 5V power source circuit is a circuit that steps down the voltage of the battery 158 for supply to the microcomputer 172.

The power source voltage monitor 182 detects fluctuations in the voltage of the battery 158 configuring the power source, and the microcomputer 172 outputs a PWM signal from the three-phase output circuit 172E so as to cancel out the effect of any such fluctuations in voltage detected by the power source voltage monitor 182. Specifically, in cases in which the voltage of the battery 158 as detected by the power source voltage monitor 182 is higher than 12V, this being a standard voltage, the microcomputer 172 outputs a PWM signal so as to lower the duty ratio from that for the standard voltage. In cases in which the voltage of the battery 158 as detected by the power source voltage monitor 182 is lower than 12V, this being the standard voltage, the microcomputer 172 outputs a PWM signal so as to raise the duty ratio from that for the standard voltage.

Operation and Advantageous Effects of Present Exemplary Embodiment

Next, explanation follows regarding operation and advantageous effects of the present exemplary embodiment.

As illustrated in FIG. 1, in the electric pump P provided with the motor unit 20 of the present exemplary embodiment described above, when the stator 31 is supplied with power by the circuit board 80, a rotating magnetic field is generated by the stator 31 and rotation force is generated in the rotor 21 by this rotating magnetic field, with the result that the impeller 10 rotates together with the rotor 21. The rotation of the impeller 10 causes fluid to be taken in through the intake port 55 of the inlet 53 and transported to the pump chamber 51, and causes the fluid that has been transported to the pump chamber 51 to then be discharged through the discharge port 56 of the outlet 54.

As illustrated in FIG. 2 and FIG. 3, in the present exemplary embodiment, the capacitor 220 is provided between the neutral point 210 and the shunt resistor 230 used for current detection. The capacitor 220 is grounded at the grounding point 250 via the shunt resistor 230 used for current detection. Providing the capacitor 220 enables fluctuations in the potential of the neutral point 210 to be reduced. This enables electromagnetic wave noise to be reduced. Moreover, due to grounding the capacitor 220 at the grounding point 250 via the shunt resistor 230 used for current detection, the voltage applied to the capacitor 220 is reduced. This enables overcurrent damage to the capacitor 220 to be suppressed. Furthermore, in this configuration, the capacitor 220 and the shunt resistor 230 are mounted on the circuit board 80, thus enabling the capacitor 220 and the shunt resistor 230 to be fixed to the circuit board 80 by soldering in the same manner as other circuit elements. This enables noise countermeasures to be put in place without adding to or complicating the fabrication process.

Figure 7:
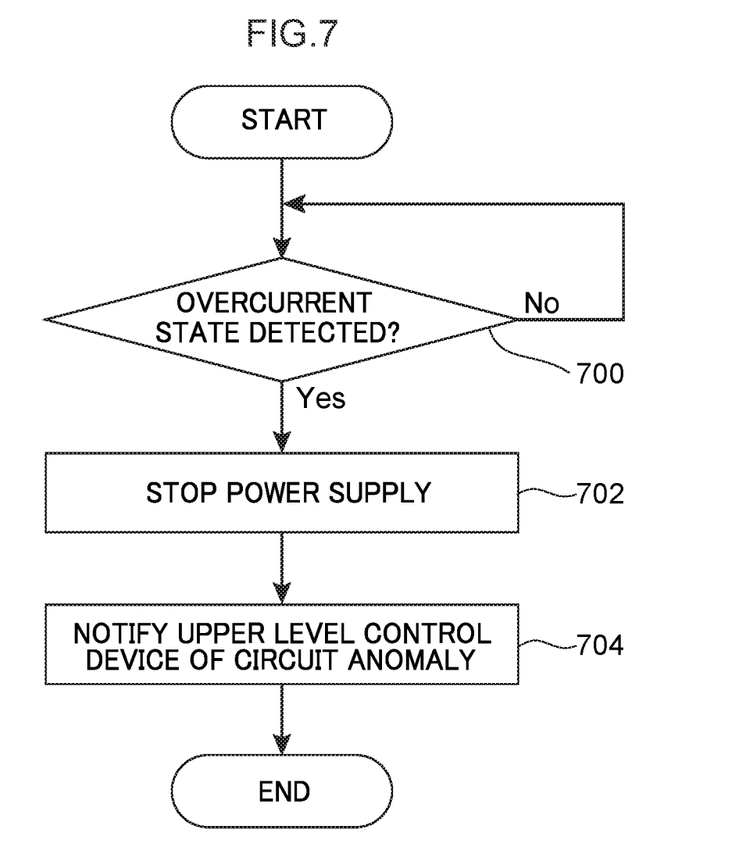
FIG. 7 is a flowchart illustrating an example of processing by a control circuit in a case in which an overcurrent detection circuit has detected an overcurrent state.

However, in cases in which an overcurrent state of the circuit including the capacitor 220 has been detected based on the potential difference between the two ends of the shunt resistor 230, it is conceivable that this overcurrent could cause damage to the capacitor 220. The processing illustrated in FIG. 7 is therefore performed in such cases. FIG. 7 is a flowchart illustrating an example of processing performed by the control circuit 170 in cases in which the overcurrent detection circuit 178 has detected an overcurrent state.

At step 700, determination is made as to whether or not the overcurrent detection circuit 178 has detected an overcurrent state. In cases in which an overcurrent state has been detected, the processing proceeds to step 702. In cases in which an overcurrent state has not been detected, the overcurrent state detection procedure at step 700 is continued.

At step 702, the generation of the voltage to be supplied to the windings 34U, 34V, 34W is stopped, and supply of power to the motor unit 20 is stopped. At step 704, the vehicle ECU 190 configuring an upper level control device is notified of the circuit anomaly, and the processing is ended.

As a result of the processing illustrated in FIG. 7, supply of power to the motor unit 20 is stopped and the upper level control device is notified of the circuit anomaly in cases in which the capacitor 220 has been damaged or the like. Stopping the supply of power to the motor unit 20 enables damage to the elements mounted on the circuit board 80 to be prevented from becoming more serious. Moreover, the upper level control device can perform a display on an instrument panel or the like of the vehicle to indicate the occurrence of an anomaly in the circuitry of the circuit board 80, enabling a user to respond appropriately, such as by organizing repair.

Hitherto, two or more serially connected capacitors 220 were needed between the neutral point 210 and the grounding point 250 as a countermeasure against damage to the capacitors 220 in an overcurrent state. However, mounting two or more capacitors would result in a spike in product fabrication costs due to mounting the extra capacitors 220.

In the present exemplary embodiment, an overcurrent state in which the capacitor 220 has been damaged is detected using the shunt resistor 230, the amplifier 232, and the overcurrent detection circuit 178 that are already mounted for the purpose of motor current detection, thereby enabling an overcurrent state of the circuit to be addressed without the need to mount plural capacitors 220.

An exemplary embodiment of the present disclosure has been explained above. However, the present disclosure is not limited to the above description, and obviously various other modifications may be implemented within a range not departing from the spirit of the present disclosure.

The entire content of the disclosure of Japanese Patent Application No. 2018-146596 filed on Aug. 3, 2018 is incorporated by reference in the present specification.

All cited documents, patent applications, and technical standards mentioned in the present specification are incorporated by reference in the present specification to the same extent as if each individual cited document, patent application, or technical standard was specifically and individually indicated to be incorporated by reference.

The invention claimed is:

1. A motor comprising:
 a stator including a plurality of windings that form coils and are connected together at a neutral point;
 a switching circuit that generates a rotating magnetic field around the stator by switching of a power supply to the plurality of windings;
 a rotor that rotates in response to the rotating magnetic field generated around the stator;
 a resistor for current detection that detects a current in the switching circuit and that is disposed between the switching circuit and a grounding point; and
 a filter element that reduces a fluctuation in potential at the neutral point, the filter element being disposed between the neutral point and the resistor for current detection and being grounded at the grounding point via the resistor for current detection.

2. The motor of claim 1, further comprising:
 a current detection circuit that detects a current in the filter element based on a potential difference between two ends of the resistor; and
 a control circuit that stops operation of the switching circuit in a case in which the current detected by the current detection circuit has exceeded a predetermined threshold.

3. The motor of claim 1, further comprising a reverse connection protection element mounted between the neutral point and the grounding point.

4. The motor of claim 3, wherein the reverse connection protection element is mounted between the resistor and the grounding point.

5. The motor of claim 1, wherein the filter element and the resistor are mounted on a circuit board integrated with the motor.

6. The motor of claim 5, wherein the neutral point and the filter element are connected together on the circuit board.

7. The motor of claim 5, wherein the filter element and the resistor are connected together on the circuit board.

8. The motor of claim 3, wherein the filter element, the resistor, and the reverse connection protection element are mounted on a circuit board integrated with the motor.

9. The motor of claim 5, further comprising:
 a motor housing to house the stator and the rotor; and
 a support member disposed in the motor housing,
 wherein the circuit board is disposed on an opposite side of the support member from the motor housing.

10. The motor of claim 5, further comprising:
 a motor housing to house the stator and the rotor; and
 a support member disposed in the motor housing,
 wherein the circuit board is housed inside a board housing disposed on an opposite side of the support member from the motor housing.

11. The motor of claim 1, further comprising motor housing to house the stator and the rotor, wherein:
 the motor housing has a double-walled structure including a closed-bottomed tube-shaped inner cylinder including an opening on one side, and a closed-bottomed tube-shaped outer cylinder including an opening on one side; and
 the opening in the inner cylinder and the opening in the outer cylinder open toward opposite sides to one another.

12. The motor of claim 11, wherein the inner cylinder houses the rotor so as to allow the rotor to rotate, and the outer cylinder houses the stator.

13. The motor of claim 1, further comprising:
a motor housing to house the stator and the rotor;
a pump housing that is disposed on one side of the motor housing, in an axial direction of the rotor, and that includes a pump chamber to house an impeller connected to the rotor, and an intake port and a discharge port that are in communication with the pump chamber;
a circuit board on which the switching circuit, the resistor, and the filter element are mounted; and
a board housing to house the circuit board and disposed on the other side of the motor housing in the rotor axial direction.

* * * * *